No. 748,675. PATENTED JAN. 5, 1904.
J. F. WEBER.
SOD CUTTING PLOW.
APPLICATION FILED APR. 14, 1902. RENEWED JULY 24, 1903.
NO MODEL.
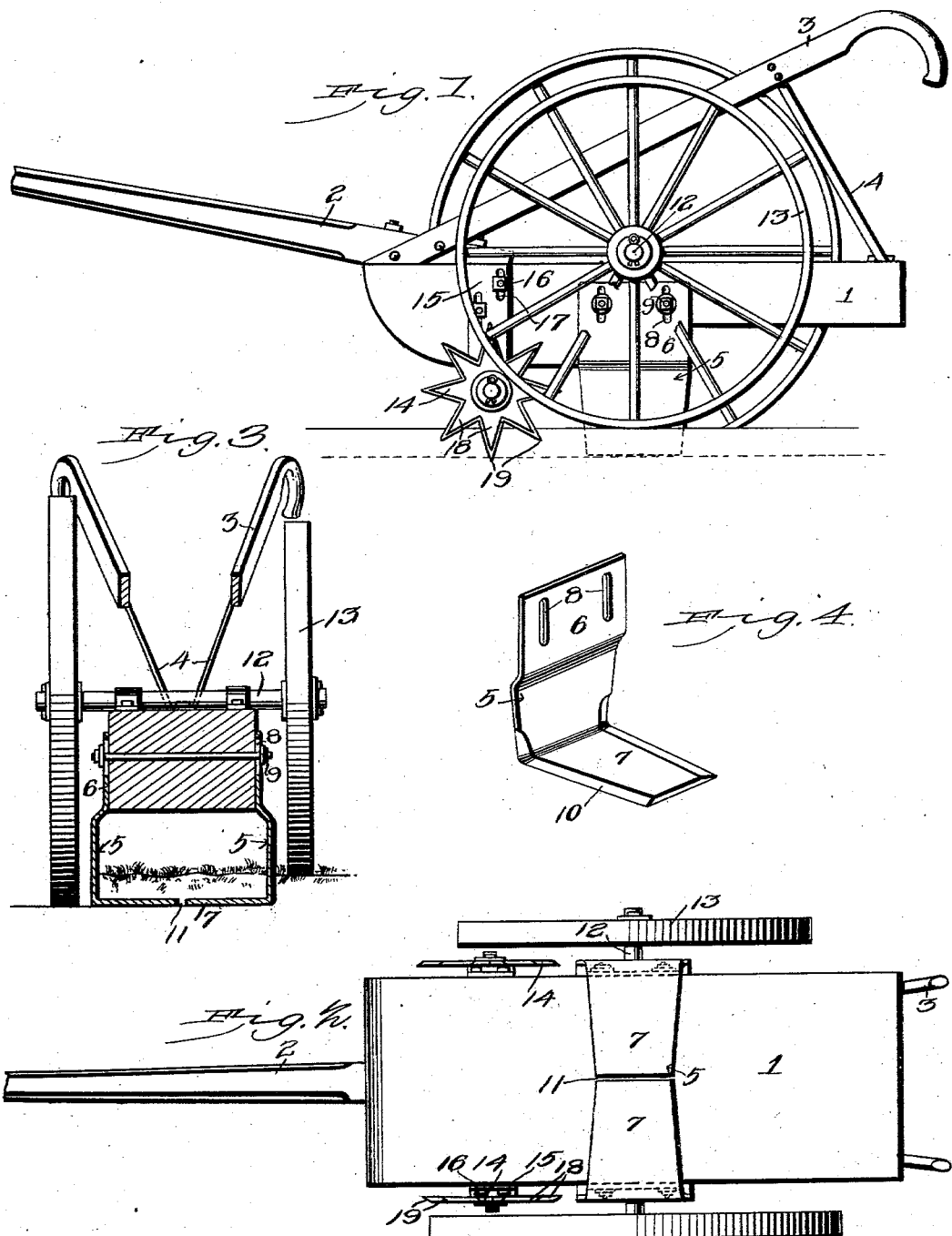

No. 748,675. Patented January 5, 1904.

UNITED STATES PATENT OFFICE.

JOSEPH F. WEBER, OF HASTINGS, MICHIGAN.

SOD-CUTTING PLOW.

SPECIFICATION forming part of Letters Patent No. 748,675, dated January 5, 1904.

Application filed April 14, 1902. Renewed July 24, 1903. Serial No. 166,910. (No model.)

*To all whom it may concern:*

Be it known that I, JOSEPH F. WEBER, a citizen of the United States, residing at Hastings, in the county of Barry and State of Michigan, have invented a new and useful Sod-Cutting Plow, of which the following is a specification.

My invention is an improved sod-cutting plow; and it consists in the peculiar construction and combination of devices hereinafter fully set forth and claimed.

One object of my invention is to effect improvements in the construction and disposition of the blades which cut the under side of the sod, so that the same are kept clear of roots, twigs, and other obstructions.

A further object of my invention is to combine with the frame and the cutter, which cuts the under side of the sod, an axle which is disposed directly above said cutter and to which the supporting-wheels are attached whereby the sods are cut of uniform depth.

In the accompanying drawings, Figure 1 is a side elevation of a sod-cutting plow embodying my improvements. Fig. 2 is an inverted plan view of the same. Fig. 3 is a vertical transverse sectional view of the same. Fig. 4 is a detail perspective view of one of the cutters which cut the under side of the sod.

In the embodiment of my invention I provide a frame 1, which is here shown as a solid body, but which may be of any other suitable construction. To the front portion of the same is attached a draft-tongue 2 and the front ends of the handles 3. Suitable braces 4 are preferably provided for the said handles.

I employ a pair of cutters 5 to cut the under side of the sod. The said cutters are preferably of the form and construction shown in Fig. 4 and each is provided with a vertical standard portion 6 and a laterally-extending horizontal blade 7 at the lower end thereof. The standard portions 6 are provided with vertical slots 8 and bear against opposite sides of the frame 1, to which they are secured by bolts 9, which are disposed in the slots 8. By this construction and combination of devices the cutters 5 are vertically adjustable with relation to the frame 1 to adapt the plow to cut sod of any desired depth. The blades 7 of the cutters 5 are provided with oblique cutting edges 10, those on the front sides of said blades extending rearwardly to the inner ends thereof, and the axial extent of the said blades is such that when the cutters are secured to the frame the inner ends of the said blades are spaced apart, as at 11, the width of the said space being in practice about one inch. The rearwardly disposed or inclined front cutting edges of the blades 7 effect shear cuts on the under side of the sod and have the effect of working twigs, roots, and other obstructions inwardly toward the opening 11, through which opening the said obstructions pass, and hence the said blades 7 are kept clear and do not become obstructed when the plow is in operation. In practice the cutting-blades 7 are preferably provided on both sides with reversely-disposed sharpened cutting edges 10, so that the cutters 5 are rendered reversible, as will be understood.

On the frame 1, at a point directly above the cutters 5, is an axle 12. The supporting-wheels 13, which are mounted on the said axle, coact with the cutters 5 to determine the depth of the sod, as will be understood, and after the first strip of sod has been cut a wheel of larger size than the other is placed on the axle, the larger wheel running on the land from which the sod has been removed and the other wheel running on the turf, thereby maintaining the cutters 7 in a horizontal position or exactly parallel with the surface of the turf, so that the sods are cut of uniform depth throughout their lateral extent. Furthermore, this disposition of the supports for the frame directly in line with the under cutters enables the plow to conform to inequalities in the surface of the turf without varying the depth of the sod cut thereby, as will be understood.

In advance of the standard portions of the undercutters are revoluble cutters 14 for cutting the sides of the sods. The said revoluble cutters have their bearings on standards 15, which are secured to the sides of the frame 1 by bolts 16, that operate in vertical slots 17, with which said standards are provided, hence enabling the latter to be vertically adjusted to regulate the depth of the cuts made by the revoluble cutters 14. The latter are provided with radial cutting-blades 18, the sides of which converge outwardly to a point 19 and are sharpened and provided with cutting edges. By thus forming the revoluble cutters the pointed blades thereof are adapted to readily enter the turf with their cutting edges at such angles as to effect shear cuts, thereby preventing the sides of the sod from being cut raggedly and unevenly, and, moreover, this construction of the blades of the revoluble cutters adapts said cutters to cut through small roots and other buried obstructions and to greatly facilitate the operation of the plow.

Having thus described my invention, I claim—

1. In a sod-cutting plow, the combination of a frame, supports therefor to bear on the ground, and cutters having vertical standard portions secured to the frame and lateral horizontally-disposed blades, said cutters being disposed directly opposite each other and having their horizontal blades provided with oblique front cutting edges extending rearwardly to their inner ends, the inner ends of the said blades being spaced apart, to permit roots, twigs and the like to pass between them, substantially as described.

2. A sod-cutting plow having a frame, a cutter carried thereby to cut the under side of the sod, an axle disposed directly above the cutter, and side cutters, to cut the sides of the sod and disposed in advance of the first-mentioned cutter, substantially as described.

3. In a sod-cutting plow, the combination of a frame, an axle attached thereto, supporting-wheels on said axle on opposite sides of said frame, one of said supporting-wheels being of greater diameter than the other, and cutters having vertical standard portions secured to and vertically adjustable on the frame and provided with lateral horizontally-disposed undercutting-blades, substantially as described.

In testimony that I claim the foregoing as my own I have hereto affixed my signature in the presence of two witnesses.

JOSEPH F. WEBER.

Witnesses:
   THOMAS SULLIVAN,
   MYRA L. FIESTER.